US008998644B2

(12) United States Patent
Fukaya

(10) Patent No.: US 8,998,644 B2
(45) Date of Patent: Apr. 7, 2015

(54) CONNECTOR HOLDER

(75) Inventor: Hiroki Fukaya, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 36 days.

(21) Appl. No.: 13/877,738

(22) PCT Filed: Mar. 28, 2011

(86) PCT No.: PCT/JP2011/057604
§ 371 (c)(1),
(2), (4) Date: Apr. 4, 2013

(87) PCT Pub. No.: WO2012/046467
PCT Pub. Date: Apr. 12, 2012

(65) Prior Publication Data
US 2013/0189875 A1 Jul. 25, 2013

(30) Foreign Application Priority Data
Oct. 8, 2010 (JP) ................ 2010-228743

(51) Int. Cl.
H01R 9/11 (2006.01)
H01R 13/73 (2006.01)
B60R 16/02 (2006.01)
H01R 13/74 (2006.01)
B60L 11/14 (2006.01)

(52) U.S. Cl.
CPC .......... *H01R 13/73* (2013.01); *B60R 16/0207* (2013.01); *H01R 13/745* (2013.01); *B60R 16/0215* (2013.01); *B60L 11/14* (2013.01); *H01R 2201/26* (2013.01); *B60L 2210/40* (2013.01); *Y02T 10/7077* (2013.01); *Y02T 10/7241* (2013.01)

(58) Field of Classification Search
USPC ............... 439/540.1, 533, 557, 368, 623; 174/72 A
See application file for complete search history.

(56) References Cited

U.S. PATENT DOCUMENTS

| 4,861,282 A | * | 8/1989 | Kobayashi et al. ........ 439/540.1 |
| 4,923,411 A | * | 5/1990 | Hayashi et al. ............ 439/540.1 |
| 5,366,388 A | * | 11/1994 | Freeman et al. ........... 439/540.1 |
| 5,545,053 A | * | 8/1996 | Ishii et al. ..................... 439/364 |

(Continued)

FOREIGN PATENT DOCUMENTS

| JP | 56-126783 | 9/1981 |
| JP | 11-48882 | 2/1999 |

(Continued)

OTHER PUBLICATIONS

International Search Report of Apr. 19, 2011.

*Primary Examiner* — Phuong Dinh
(74) *Attorney, Agent, or Firm* — Gerald E. Hespos; Michael J. Porco; Matthew T. Hespos

(57) ABSTRACT

Provided is a connector holder (25) suitable for use when connecting wire harnesses (10, 12) to each other by mating a plurality of connectors (40A to 40C, 41A to 41C). The connector holder is configured to be fitted into and fixed to a through hole (2a) in a vehicle body panel (2) that creates partitions, and to accommodate and hold the plurality of connectors (40A to 40C) that are connected to a group of electric wires of the wire harness (10) routed on one side of the vehicle body panel, the connectors being mated to connectors (41A to 41C) for a wire harness (12) routed on the other side of the vehicle body panel.

8 Claims, 7 Drawing Sheets

(56) References Cited

U.S. PATENT DOCUMENTS 5,651,683 A * 7/1997 Shimamura et al. ............ 439/34
6,575,794 B1 * 6/2003 Nakamura .................... 439/701
6,739,893 B2 * 5/2004 Hallitschke et al. .......... 439/248

FOREIGN PATENT DOCUMENTS

| JP | 2003-257564 | 9/2003 |
| JP | 2007-273115 | 10/2007 |
| JP | 2008-108529 | 5/2008 |

* cited by examiner

CONNECTOR HOLDER

BACKGROUND

1. Field of the Invention

The present invention relates to a connector holder, in particular, to a connector holder for use when connecting a plurality of connectors that are connected to terminals of wire harnesses routed in a vehicle, and specifically, to a connector holder suitable for use for connecting connectors of wire harnesses routed in a hybrid automobile in which a new wire harness corresponding to a system for an HEV is added to an existing wire harness corresponding to a general-purpose internal combustion engine drive system.

2. Description of the Related Art

As a connector holder for holding a plurality of connectors that are connected to wire harnesses routed in an automobile, the applicant of the present application has proposed a connector holder 100 that is disclosed in JP 2003-257564 A (see FIG. 7). The connector holder 100 includes a bottom wall 100a and a circumferential wall 100b, and has a dish-like shape with an open top and a deep bottom. The connector holder 100 accommodates a plurality of connectors (not shown) that are connected to terminals of wire harnesses, lockingly fixing the plurality of connectors. On the circumferential wall 100b, vehicle body lock portions 101 are provided, which are inserted into and fixed to an opening of the vehicle body.

Since the connector holder 100 of FIG. 7 is open on its connector insertion side, but closed on the opposite side constituting the bottom wall, the connector holder 100 has only a mechanism for accommodating and holding the connectors connected to the wire harnesses. That is, the connector holder 100 is not configured to mate connectors of a pair of wire harnesses to each other that are routed from opposing directions to the connector holder 100, and to hold the mated connectors.

As described above, a conventional connector holder has only a functionality of accommodating and holding a plurality of connectors connected to wire harnesses, and of being mounted on a vehicle body or another fixing material. Therefore, the connectors accommodated in the connector holder are ordinarily joint connectors or the like. That is, the configuration is not such that after a connector holder that accommodates and holds connectors is fixed to a vehicle body, connectors of another wire harness are mated and connected to the connectors accommodated and held in the connector holder. If other connectors are mated and connected to the connectors accommodated and held in the connector holder, there is no other choice but to route the pair of wire harnesses subjected to connector connection from the same direction to the connector holder and to insert the connectors into the connector holder. The conventional connector holder is thus not applicable to connector connection of wire harnesses that are routed from opposing directions. Therefore, the conventional connector holder is not applicable when holding and mating connectors, to each other, of a pair of wire harnesses that are arranged so as to face each other across a through hole bored in a vehicle body panel.

Accordingly, it is an object of the present invention to provide a connector holder capable of connecting a plurality of connectors connected to a wire harness to connectors of another wire harness that is routed from the opposite direction together at a single location.

SUMMARY OF THE INVENTION

In order to attain the above-mentioned object, the present invention provides a connector holder that is configured to be fitted into and fixed to a through hole of a vehicle body panel, and to accommodate and hold a plurality of connectors that are connected to a group of electric wires of a wire harness that is routed on one side partitioned by the vehicle body panel, the plurality of connectors being mated to connectors of another wire harness that is routed on the other side of the vehicle body panel.

The connector holder of the present invention may include: a circumferential frame that is shaped so as to fit into the through hole of the vehicle body panel; a bottom wall that is enclosed by the circumferential frame; and a plurality of connector holding holes that are bored through the bottom wall, the connector holder being configured to be inserted into and fixed to the through hole of the vehicle body panel in a state in which the plurality of connectors of the wire harness on the one side are respectively fitted into and fixed to the connector holding holes, the connectors of the other wire harness on the other side being mated to the plurality of connectors of the wire harness on the one side in this state.

As described above, the connector holder of the present invention is configured to be fitted into and fixed to the through hole of the vehicle body panel, and includes the connector holding holes that are bored through the bottom wall. The plurality of connectors of the one wire harness are inserted into and fixed to the connector holding holes from one side, and the connectors of the other wire harness that are routed in the vehicle are inserted into an opening on the other side of the connector holder so as to be mated to the connectors inserted into and fixed to the connector holding holes. This makes it possible to connect, by using the connector holder, the connectors to each other that are routed in a vehicle and arranged so as to face each other in the through hole of the vehicle body panel.

The plurality of connectors of the other wire harness may be mated to the plurality of connectors held in advance by the connector holder in a one-to-one correspondence. It is also possible that a single large connector of the other wire harness is mated to the plurality of connectors fitted and held by the connector holder.

The connector holder of the present invention is preferably a molded resin article whose cross-section is a polygon, and includes panel lock portions, which are provided on an outer surface of the polygonal circumferential frame and configured to be inserted into the through hole of the vehicle body panel and to interlock with a rim of the through hole, and connector lock portions, which are provided on inner circumferences of the plurality of connector holding holes.

By making the shape of the connector holder a polygon as described above, it is possible to fix the connector holder non-rotatably in the through hole of the vehicle body panel. Therefore, although a relatively large force is applied to the connector holder when inserting connectors into the connector holder and fixing them thereto from one side, and when mating counterpart connectors to the fixed connectors, it is possible to firmly fix the connectors at appropriate positions while preventing the connector holder from being twisted at that time.

The connector holder may have a shape of a quadrangle or an octagon, the panel lock portions may be constituted by lock claws, which are provided in the central portions of outer surfaces of the sides of the quadrangle or of four sides, that is, the left, the right, the top, and the bottom sides of the octagon, projecting at an angle from an end on an insertion side toward an end on the other side, and a receiving plate, which projects from the end on the other side, and each connector lock portion may be shaped so as to engage a portion to be locked that is provided on the outer surface of the connector.

It is preferable that the connector holder be configured to be inserted into and fixed to the through hole bored in the vehicle body panel, which partitions a hybrid automobile into a vehicle interior and a rear luggage compartment where HEV components are arranged, a floor harness be routed on the vehicle interior side of the vehicle body panel, and a rear harness, which is connected to electric components for the rear side that include HEV components and rear lamps, be routed on the rear luggage compartment side, and a plurality of connectors of any one of the floor harness and the rear harness be mounted in advance in the connector holder, and when this wire harness is routed, the connector holder be inserted into and fixed to the through hole of the vehicle body panel, so that the plurality of connectors serve as connection-ready connectors, a plurality of connectors of the other wire harness being mated, after being routed in the vehicle, to the connection-ready connectors.

When in a hybrid automobile, in addition to a conventional internal combustion engine drive system that uses gasoline fuel, a system for an HEV such as a heavy-duty electric battery, a traction motor driven by the battery, and an inverter are mounted, an HEV wire harness is also added to the existing wire harness. Since the HEV components including the heavy-duty electric battery and the motor are ordinarily provided mainly on the rear luggage compartment side of the vehicle, the HEV harness is routed in the rear luggage compartment. In an existing automobile driven by an internal combustion engine, the total number of electric wires routed in the rear luggage compartment is relatively low, so that a group of electric wires routed on the rear luggage compartment side is incorporated into the floor harness.

However, if the HEV harness to be routed in the rear luggage compartment is incorporated into the floor harness of an automobile driven by an internal combustion engine in order to configure a hybrid automobile, the weight of the floor harness will be increased by 40 to 50% relative to the weight of an existing floor harness. If the weight of the wire harness is approximately doubled in this manner, an existing platform (drawing board) on which the wire harness is assembled cannot be used and thus a new larger drawing board needs to be provided. Further, the man-hours when routing the wire harnesses will be increased and wiring of electric wires will be complicated, resulting in an increase in work burden. Furthermore, there is a problem that the transportation of the assembled large wire harness is a burden, and a routing operation of such assembled large wire harness in an automobile is also a burden.

Therefore, as described above, it is preferable that, separately from the floor harness, a rear harness be provided, which is constituted by a group of electric wires that are connected to HEV components including a battery mounted in the vehicle rear part, and a group of electric wires that are connected to components such as existing rear lamps and a license lamp that are mounted in the vehicle rear part, the connector holder of the present invention being inserted into and fixed to the through hole provided in a panel that partitions the vehicle interior and the rear luggage compartment, connectors of the rear harness being mated to connectors of the floor harness that have been inserted into and fixed to the connector holder in advance. It is also possible that the connectors of the rear harness have been inserted into and fixed to the connector holder in advance, and the connectors of the floor harness are mated to the connectors of the rear harness.

Note that when the floor harness is divided into the right floor harness and the left floor harness, any one of the right floor harness and the left floor harness, preferably the left floor harness, may be connected to the rear harness using connectors. The left floor harness is preferably a commonly used floor harness that is shared with other types of vehicles that are manufactured on the same platform.

In a car manufacturer (an automotive assembly manufacturer), various types of vehicles, such as a sedan, a van, a wagon, and a box type, are manufactured on the same platform by changing the design of the vehicle rear part, in particular, by changing a configuration of the rear luggage compartment and locations where rear lamps, a license lamp, and the like are mounted. Those changes necessitate a change in wiring in a rear portion behind the backseat. Therefore, the rear end of the floor harness that can be used commonly is up to the backseat position in the vehicle interior, that is, the commonly used floor harness and the rear harness are arranged separately from each other at the location of the rear portion partition panel that partitions the backseat and the rear luggage compartment. By arranging that connectors of the commonly used wire harness serve as a plurality of connectors mounted in the connector holder, it is possible to share the connector holder and thus to reduce the component count of the connector holders, allowing a reduction in cost.

The commonly used floor harness does not include all or part of electric wires that are to be connected to optional electric components, but the other floor harness that is arranged separately includes the electric wires that are to be connected to optional electric components and not included in the commonly used floor harness. That is, of the electric wires that are to be connected to the optional electric components, the commonly used floor harness can include electric wires that are to be connected to optional electric components mounted close to the location where the commonly used floor harness is routed, however, preferably not a group of electric wires that are to be connected to optional electric components having a long length and a heavy weight, in order to achieve weight-reduction and downsizing of the commonly used floor harness.

The wire harnesses routed in a hybrid automobile encompasses large wire harnesses that each include at least 150 electric wires, preferably, six such large wire harnesses in total. The six large wire harnesses are specifically an instrument panel harness routed in an instrument panel, an engine harness connected to an engine, an engine room harness routed in an engine room, a right floor harness routed along the right edge of the floor in the front-back direction, a left floor harness routed along the left edge of the floor in the front-back direction, and a rear harness that is connected to any of the right floor harness and the left floor harness and routed in the vehicle rear part. Of course, in the hybrid automobile, door harnesses, a roof harness, and the like are also routed that include fewer electric wires than the large wire harness.

By mating and connecting connectors of the floor harness to connectors of the rear harness using the connector holder of the present invention, it is easily possible to electrically connect the floor harness and the rear harness to each other even if they are arranged separately, making it possible to prevent the individual wire harnesses from increasing in weight and size. The separately arranged rear harness has a total weight of 2500 g to 3200 g, and the commonly used floor harness to be connected to the rear harness has a total weight of 4500 g to 5200 g. As described above, if an HEV harness that is routed in the trunk room of a hybrid automobile is incorporated into the left floor harness, they are added up to a total of about 9000 g. In contrast, if the connector holder of the present invention is used for the left floor harness and the rear harness that are arranged separately from each other, the concrete estimation then shows that the left floor harness weighs about 5000 g and the rear harness weighs about 3000 g, adding up to 8000 g in total. It is thus possible to achieve a reduction in weight by about 1000 g.

As described above, the connector holder of the present invention is used so as to be inserted into and fixed to a through hole of a vehicle body panel when it is necessary to mate and connect a plurality of connectors of a pair of wire harnesses that are routed, facing each other across the through hole of the vehicle body panel. Since a plurality of connectors of one wire harness are inserted and fitted into the connector holder, it is easily possible to mate and connect counterpart connectors of the other wire harness to the connectors fixed into the connector holder. With this measure, it is possible to compactly connect together the connectors of the wire harnesses that are routed on both sides of the vehicle body panel via the connector holder mounted in the through hole of the vehicle body panel.

BRIEF DESCRIPTION OF THE DRAWINGS

FIG. 1 illustrates an embodiment in which a connector holder of the present invention is used.

FIG. 4 illustrates the connector holder.

DETAILED DESCRIPTION OF THE PREFERRED EMBODIMENTS

Hereinafter, an embodiment of the present invention will be described with reference to FIGS. 1 to 6. In this embodiment, connectors of wire harnesses that are routed in a hybrid automobile are connected using a connector holder.

Figure 1A:
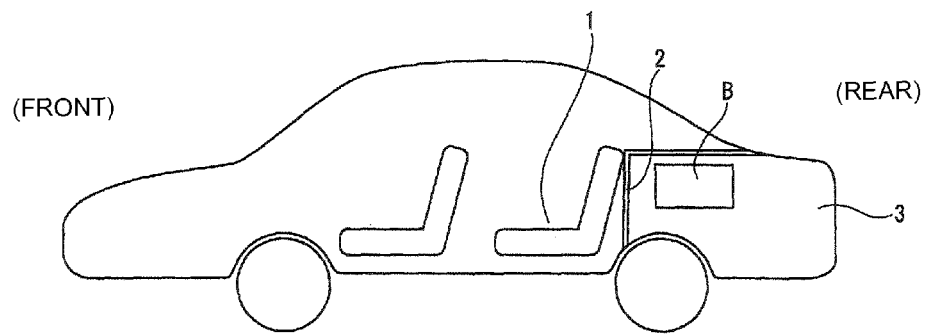
FIG. 1(A) is a diagram schematically illustrating a hybrid automobile.

As illustrated in FIG. 1(A), HEV components, such as a heavy-duty electric battery B for driving the hybrid automobile and a motor (not shown) that is connected to the battery B, are mounted on a rear luggage compartment (trunk room) 3 side of a vehicle body panel (hereinafter referred to as "partition panel") 2 that creates partitions behind a backseat 1 of the hybrid automobile.

Figure 1B:
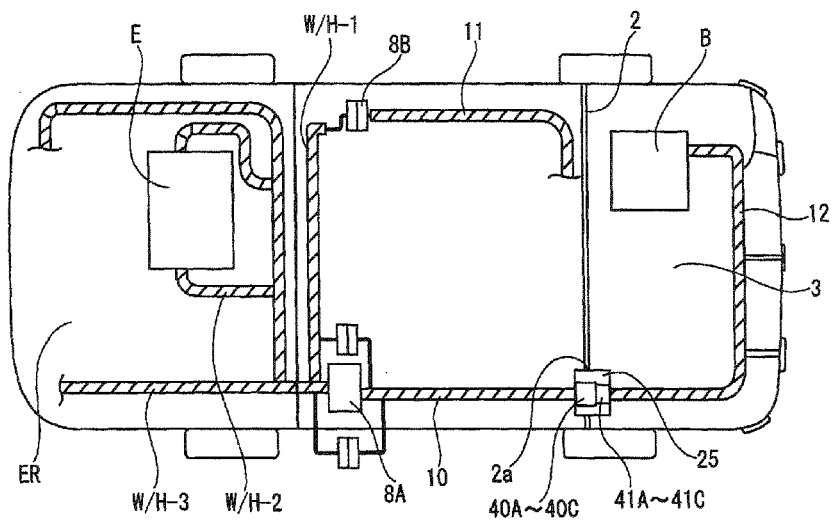
FIG. 1(B) is a plan view schematically illustrating six large wire harnesses that are routed in the hybrid automobile.

The wire harnesses that are routed in the hybrid automobile of the present embodiment are constituted by six large wire harnesses and other small wire harnesses. "Large wire harness" refers to a wire harness that includes at least 150 electric wires. As illustrated in FIG. 1(B), the six large wire harnesses are specifically an instrument panel harness W/H-1, an engine harness W/H-2 that is connected to an engine E, an engine room harness W/H-3 that is routed in an engine room ER, a left floor harness 10 that is routed along a left edge of the floor in a front-back direction, a right floor harness 11 that is routed along a right edge of the floor in a front-back direction, and a rear harness 12 that is routed on the side of the rear luggage compartment 3. That is, the six large wire harnesses are provided as wire harnesses routed in a hybrid automobile. The connectors of the left floor harness 10 and the connectors of the rear harness 12 are held by a connector holder 25, which is mounted into a through hole 2a provided in the partition panel 2, and mated to each other.

The six large wire harnesses and the other wire harnesses, such as door harnesses, which are routed in the right and left doors, and a roof harness, which is routed in a roof, are provided. The configuration of these wire harnesses is the same as that of a conventional wire harness. Namely, a plurality of groups of electric wires are bundled together using an adhesive tape or a tie band, connectors are connected to terminals of the group of electric wires, an earth terminal and a last-in terminal are connected to particular electric wire terminals, and the group of electric wires are further equipped with clips for fixing them to the vehicle body or a protector or corrugated tube for protection and guiding a route and the like.

The left floor harness 10 and the right floor harness 11 are connected, using connectors, to junction boxes 8A and 8B that are mounted in a front portion of a vehicle interior respectively, so as to be routed toward a rear portion of the vehicle. In the left floor harness 10 that is connected to the rear harness 12 using connectors, a connector 10b that is connected to its front end (see FIG. 2(A)) is connected to the junction box 8A connected to the engine room harness W/H-3. Further, at the rear end of the left floor harness 10, the main terminals are divided into three branches to which connectors 40A, 40B, and 40C are respectively connected. These connectors 40A, 40B, and 40C are configured to be arranged at a location of the partition panel 2, which partitions the backseat 1 and the rear luggage compartment 3.

Figure 2A:
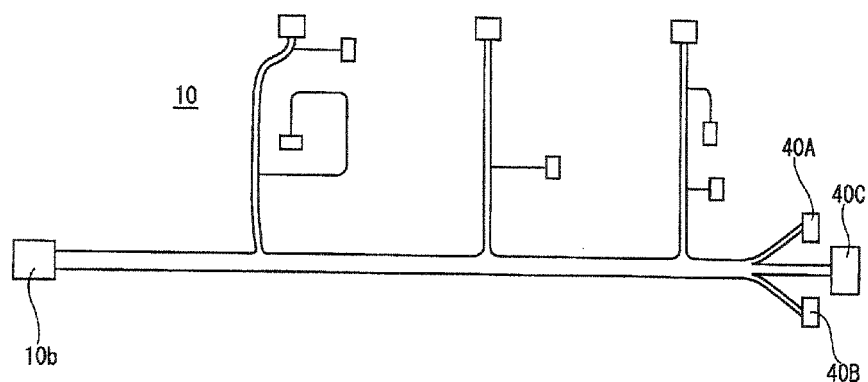
FIG. 2(A) is a diagram schematically illustrating a left floor harness.
Figure 2B:
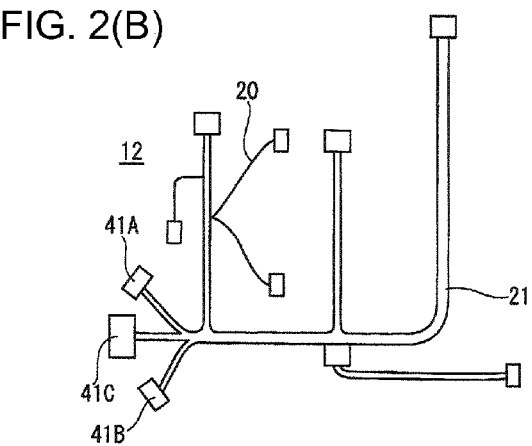
FIG. 2(B) is a diagram schematically illustrating a rear harness.

The rear harness 12 illustrated in FIG. 2(B) is constituted by an HEV harness 20 that is connected to HEV components such as the battery B and a motor mounted in the rear luggage compartment 3, and a harness 21 that is connected to electric components such as rear lamps, a license lamp, and a defogger mounted on a rear window. That is, the rear harness 12 is a harness in which the HEV harness 20 is incorporated into the existing harness 21 that is routed in an internal combustion engine type automobile using gasoline fuel. The front end of the main wires of the rear harness 12 is divided into three branches to which connectors 41A, 41B, and 41C are respectively connected. After having been routed in the automobile, the connectors 41A to 41C are mated and connected to the connectors 40A to 40C at the rear end of the left floor harness 10, respectively.

Figure 3A:
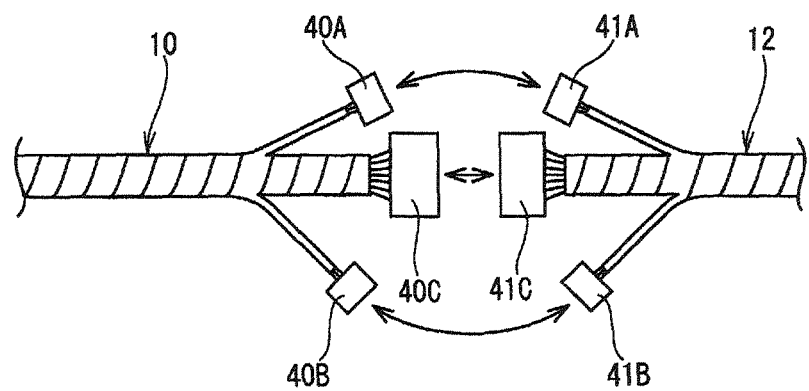
FIG. 3(A) is a diagram schematically illustrating a terminal portion where the left floor harness and the rear harness are to be connected to each other using connectors.
Figure 3B:
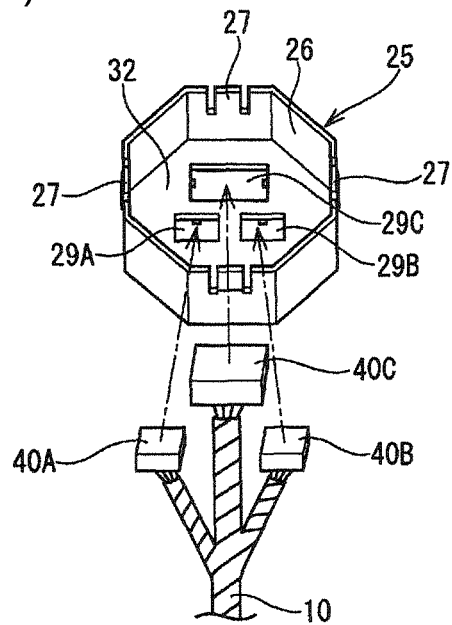
FIG. 3(B) is a diagram schematically illustrating a relationship of a connector holder and the left floor harness.
Figure 3C:
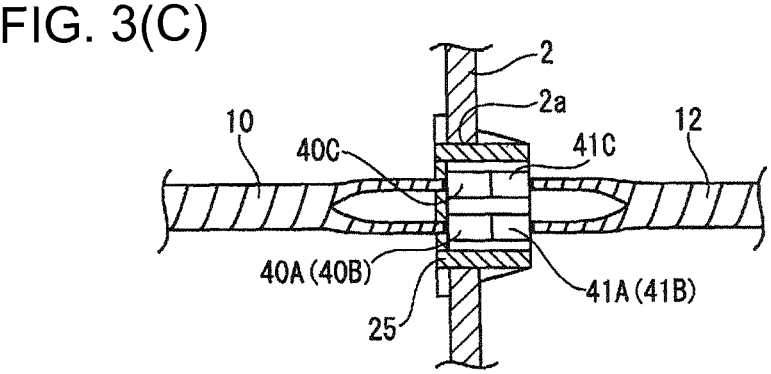
FIG. 3(C) is a diagram illustrating a state in which the connectors are held and connected to each other.

As illustrated in FIG. 3(C), the through hole 2a is provided in the partition panel 2, and the connector holder 25 is inserted into and fixed to the through hole 2a. The three connectors 40A, 40B, and 40C of the left floor harness 10 are mounted in the connector holder 25 in advance, and then mated to the connectors 41A, 41B, and 41C of the rear harness 12, respectively.

The through hole 2a of the partition panel 2 that the connector holder 25 is inserted into and fixed to is an octagonal hole. Accordingly, the connector holder 25 is a molded resin article whose outer shape is octagonal, as illustrated in FIGS. 3(B) and 4, so as to be fitted into the through hole 2a.

Figure 4A:
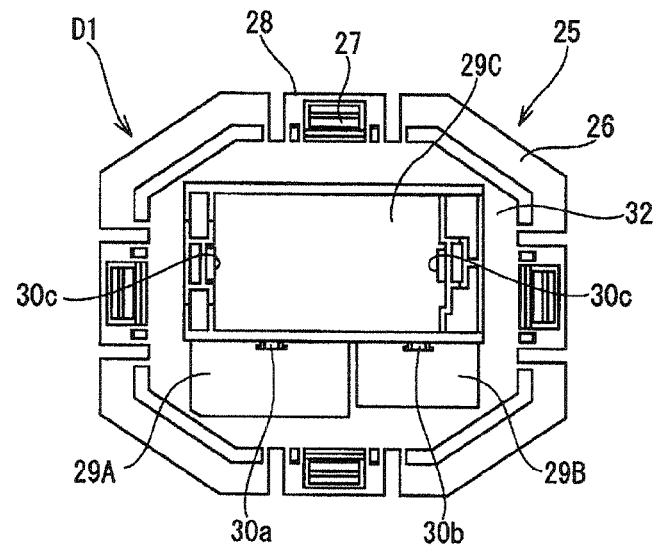
FIG. 4(A) is a front view thereof.
Figure 4B:
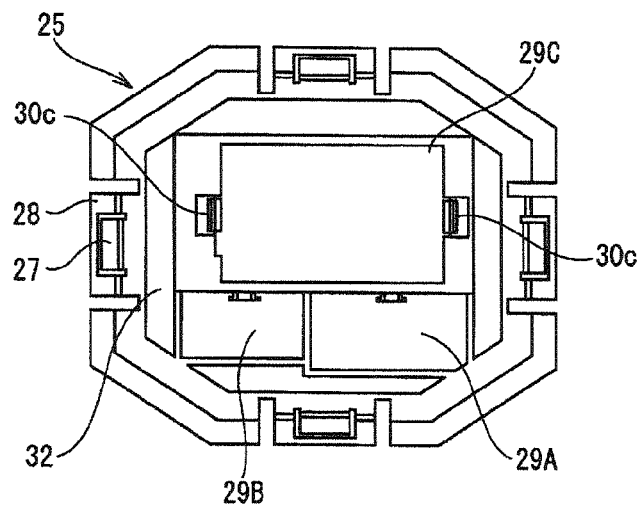
FIG. 4(B) is a rear view thereof.

In central portions of four sides, that is, the left, the right, the top and the bottom sides of an octagonal circumferential frame 26 of the connector holder 25 (see FIGS. 4(A) and 4(B)), lock claws 27 are provided so as to project from the surface of the octagonal circumferential frame 26 on an insertion side (D1), the lock claws 27 being configured to interlock with a surface 2f of the partition panel 2 at a rim of the through hole 2a. A panel receiving piece 28 is provided so as to project from the back surface on the other side that faces the lock claws 27, which serve as panel lock portions. The panel receiving piece 28 is configured to come into contact with the other surface 2s of the partition panel 2.

Further, a central portion 32 that is enclosed by the circumferential frame 26 has three through holes 29A to 29C. These through holes 29A to 29C are dimensioned so that the connectors 40A to 40C are respectively fitted into them. Furthermore, connector lock portions 30a to 30c are provided on inner circumferences of the through holes 29A to 29C, so as to lockingly couple to portions to be locked that are provided on outer housing surfaces of the connectors 40A, 40B, and 40C.

Figure 5A:
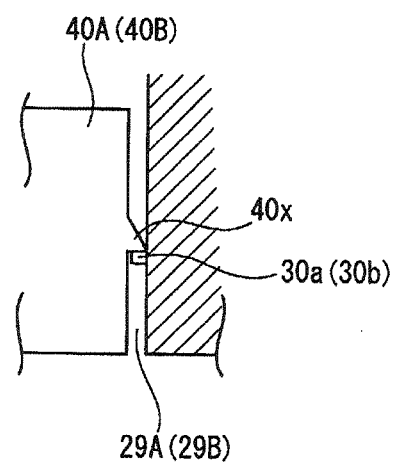
FIGS. 5(A) and 5(B) are diagrams schematically illustrating a lock connection portion where the connector holder and the connector are connected.
Figure 5B:
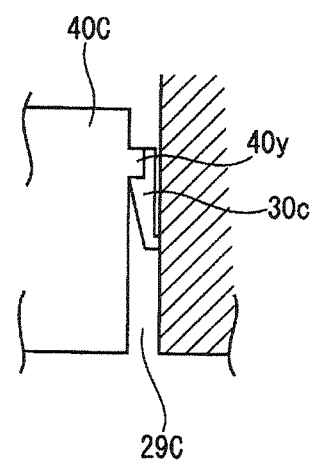

Before the left floor harness 10 is routed in an automobile, the connector holder 25 is mounted to the left floor harness 10 in advance as illustrated in FIG. 3(B). The mounting is performed in a manner illustrated in FIG. 5(A) in which the connectors 40A and 40B of the left floor harness 10 are inserted into the through holes 29A and 29B of the connector holder 25, respectively, and the connector lock portions 30a and 30b, which are provided projecting on the inner surfaces of the through holes 29A and 29B, are fixed by lockingly coupling to portions 40x to be locked, which are provided on the outer housing surfaces of the connectors 40A and 40B. The connectors 40A and 40B are thus mounted in the connector holder 25 in advance as connection-ready connectors. Moreover, as illustrated in FIG. 5(B), the connector 40C is inserted into the through hole 29C, and the connector lock portion 30c, which is provided projecting on the inner surface of the through hole 29C, is fixed by lockingly coupling to a portion 40y to be locked, which is provided on the outer housing surface of the connector 40C. The connector 40C is thus mounted in the connector holder 25 in advance as a connection-ready connector.

Figure 4C:
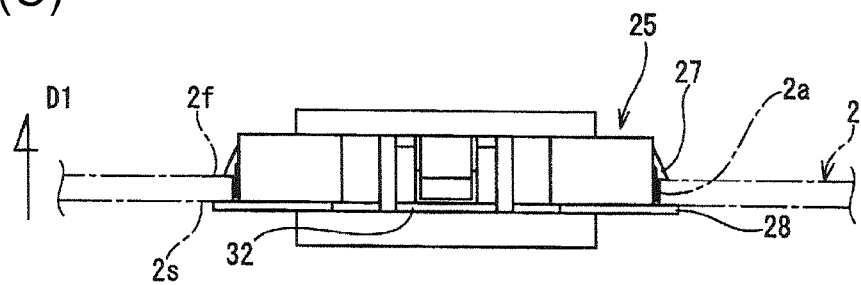
FIG. 4(C) is a cross-sectional view thereof.

As described above, the left floor harness 10 is routed in the automobile in a state in which the connector holder 25 is mounted in advance to the rear end of the left floor harness 10. When routing the left floor harness 10, the connector holder 25 is inserted into the through hole 2a of the partition panel 2 and, as illustrated in FIG. 4(C), the lock claws 27, which are the panel lock portions and provided on the four sides, interlock with one surface 2f side of the partition panel 2 at a rim of the through hole 2a, and the panel receiving piece 28 is brought into contact with the other surface 2s and fixed thereto. In the state illustrated in FIG. 6(A) in which the connector holder 25 is fitted into the through hole 2a, the connectors 40A to 40C of the left floor harness 10 are mounted in the through hole 2a that is opened toward the rear luggage compartment 3, so as to serve as connection-ready connectors.

Figure 6A:
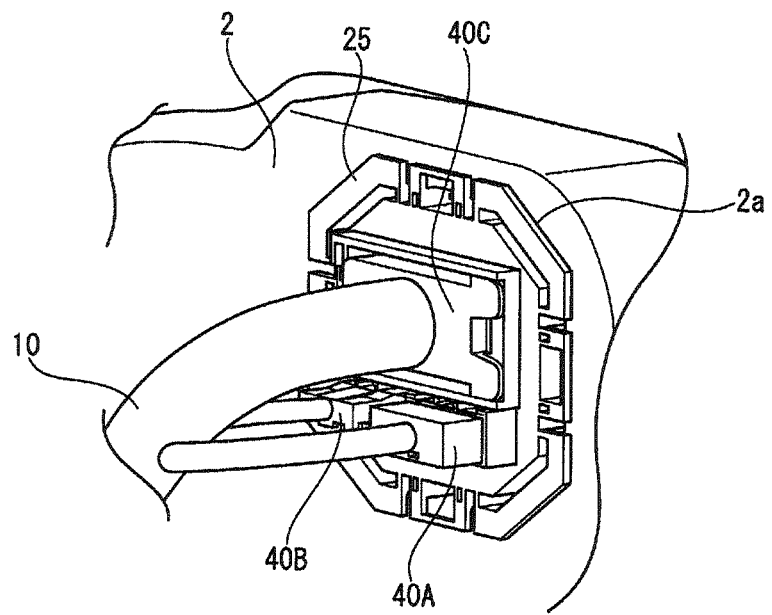
FIG. 6(A) is a perspective view illustrating a state in which the connector holder attached to the left floor harness is mounted in a through hole of a partition panel of a vehicle body.
Figure 6B:
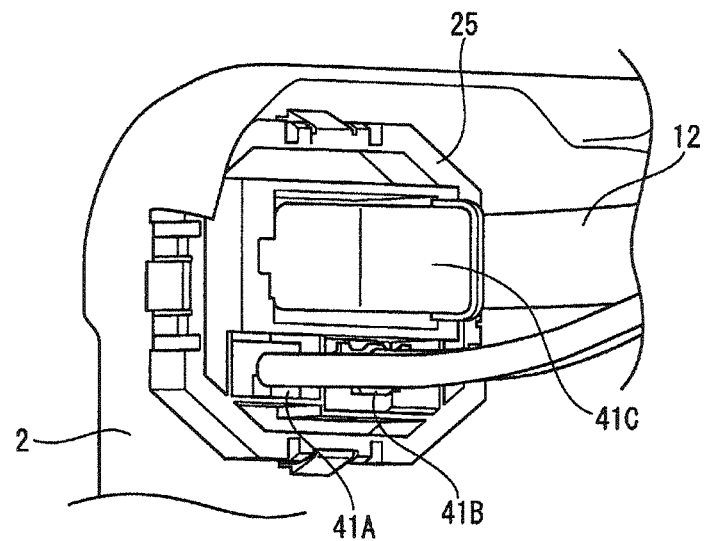
FIG. 6(B) is a perspective view illustrating a state in which connectors of the rear harness are connected to the connector holder.
Figure 7A:
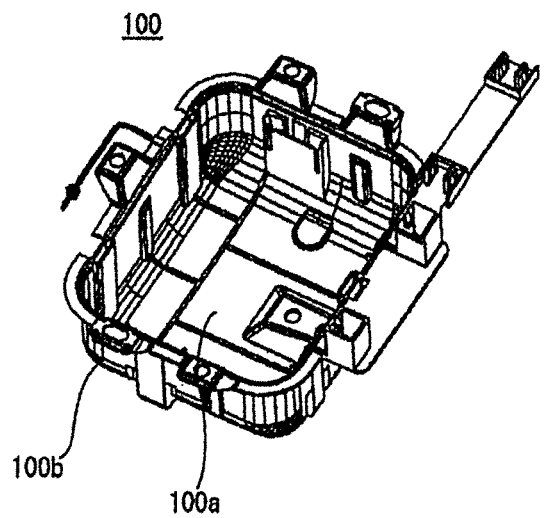
FIGS. 7(A) and 7(B) are diagrams illustrating a conventional example.
Figure 7B:
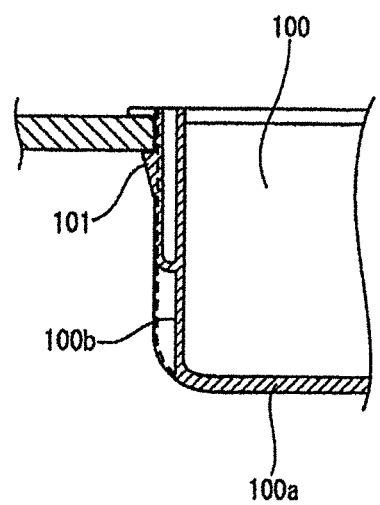

The rear harness 12 is routed in the rear luggage compartment 3 of the automobile and, as illustrated in FIG. 6(B), the connectors 41A to 41C that are connected to the front ends of the rear harness 12 are mated to the connection-ready connectors 40A to 40C that are fixed in advance to the connector holder 25.

As described above, by using the connector holder 25, that is, by fitting and fixing the connector holder 25 into the through hole 2a, it is possible to connect the three connectors 40A to 40C of the terminals of the left floor harness 10 to the three connectors 41A to 41C of the rear harness 12, respectively, through one through hole 2a.

The present invention is not limited to this embodiment, and it is also possible to configure the shape of the through hole in the vehicle body panel in which the connector holder is mounted, and the outer shape of the connector holder as a quadrangle. Further, the shape of the lock portions of the connector holder that engage the through hole of the vehicle body panel, and the shape of the lock portions included in the connector holder that fix the connectors passed through the connector holder are not limited to the above-described shapes, and any lock shape is possible if it can lock reliably. Further, the present invention is not limited to a connector holder for maintaining the connector connection of the floor harness and the rear harness, and is also applicable to a connector holder when connecting connectors of terminals of other wire harnesses to each other in a position at which the vehicle body panel creates partitions. Moreover, the present invention is not limited to hybrid automobiles, but is applicable to a configuration for connector connection of wire harnesses that are routed in any automobile, such as a gasoline automobile and an electric automobile.

The invention claimed is:

1. A connector holder that is configured to be fitted into and fixed to a through hole of a vehicle body panel, and to accommodate and hold a plurality of first connectors that are connected to a first group of electric wires of a first wire harness that is routed on a first side partitioned by the vehicle body panel, the plurality of first connectors being mated to a plurality of second connectors of a second wire harness that is routed on a second side of the vehicle body panel, the connector holder comprising:

a frame having opposite first and second ends and opposite inner and outer surfaces extending between the ends, the outer surface being shaped to fit into the through hole of the vehicle body panel, panel locks formed on the outer surface of the frame and configured to interlock with areas of the vehicle body panel adjacent the through hole; a wall extending across the first end of the frame and being formed with connector holding holes configured respectively to receive the first connectors, connector locks formed on the wall adjacent the connector holding holes and configured to retain the respective first connectors inserted into the connector holding holes, the second end of the frame being open so that the second connectors can be inserted therethrough and mated respectively to the first connectors locked to the wall.

2. The connector holder according to claim 1, wherein the plurality of second connectors of the second wire harness are mated to the plurality of first connectors held in advance by the connector holder in a one-to-one correspondence.

3. The connector holder according to claim 2, wherein the connector holder is a molded resin article whose cross-section is a polygon.

4. The connector holder according to claim 3, wherein the connector holder has a shape of a quadrangle or an octagon, the panel lock are lock claws provided in central portions of outer surfaces of the sides of the quadrangle or of alternating sides of the octagon, the lock claws projecting at an angle from an end on an insertion side toward an end opposite the inserting side, and a receiving plate projecting from the end opposite the inserting side, and each connector lock being shaped to engage a portion to be locked that is provided on an outer surface of the connector.

5. The connector holder according to claim 4, wherein the connector holder is configured to be inserted into and fixed to the through hole in the vehicle body panel that partitions a hybrid automobile into a vehicle interior and a rear luggage compartment where HEV components are arranged, a floor harness is routed on the vehicle interior side of the vehicle body panel, and a rear harness that is connected to electric components for the rear side that include HEV components and rear lamps, is routed on the rear luggage compartment side, and a plurality of connectors of any one of the floor harness and the rear harness are mounted in advance in the connector holder, and when this wire harness is routed, the connector holder is inserted into and fixed to the through hole of the vehicle body panel, so that the plurality of connectors serve as connection-ready connectors, a plurality of the connectors of the second wire harness being mated, after being routed in the vehicle, to the connection-ready connectors.

6. The connector holder according to claim 1, wherein the connector holder is a molded resin article whose cross-section is a polygon.

7. The connector holder according to claim 1, wherein the connector holder is configured to be inserted into and fixed to the through hole in the vehicle body panel that partitions a hybrid automobile into a vehicle interior and a rear luggage compartment where HEV components are arranged, a floor harness is routed on the vehicle interior side of the vehicle body panel, and a rear harness that is connected to electric components for the rear side that include HEV components and rear lamps, is routed on the rear luggage compartment side, and a plurality of connectors of any one of the floor harness and the rear harness are mounted in advance in the connector holder, and when this wire harness is routed, the connector holder is inserted into and fixed to the through hole of the vehicle body panel, so that the plurality of connectors serve as connection-ready connectors, a plurality of the connectors of the second wire harness being mated, after being routed in the vehicle, to the connection-ready connectors.

8. The connector holder according to claim 1, wherein each panel lock is formed between two slits in the frame so that each of the panel locks is cantilevered toward the second end of the frame.

* * * * *